Sept. 24, 1929.   A. C. ATTENDU   1,729,201
INTERNAL COMBUSTION ENGINE
Filed Oct. 27, 1923   12 Sheets-Sheet 2
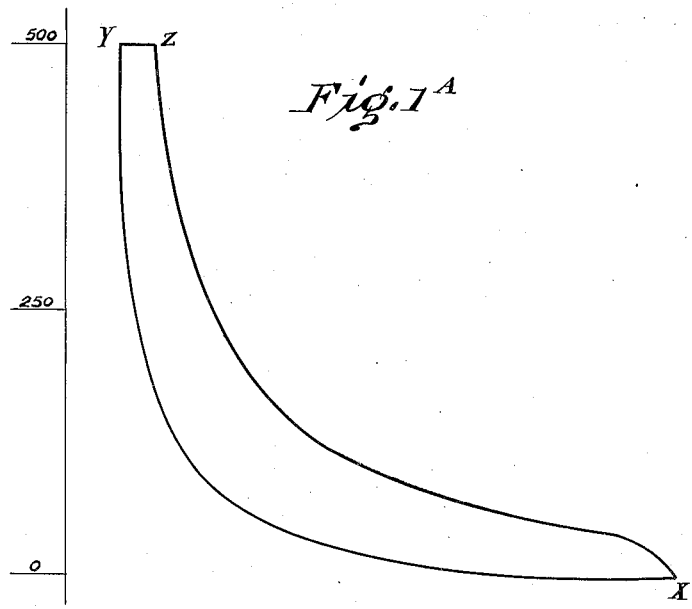
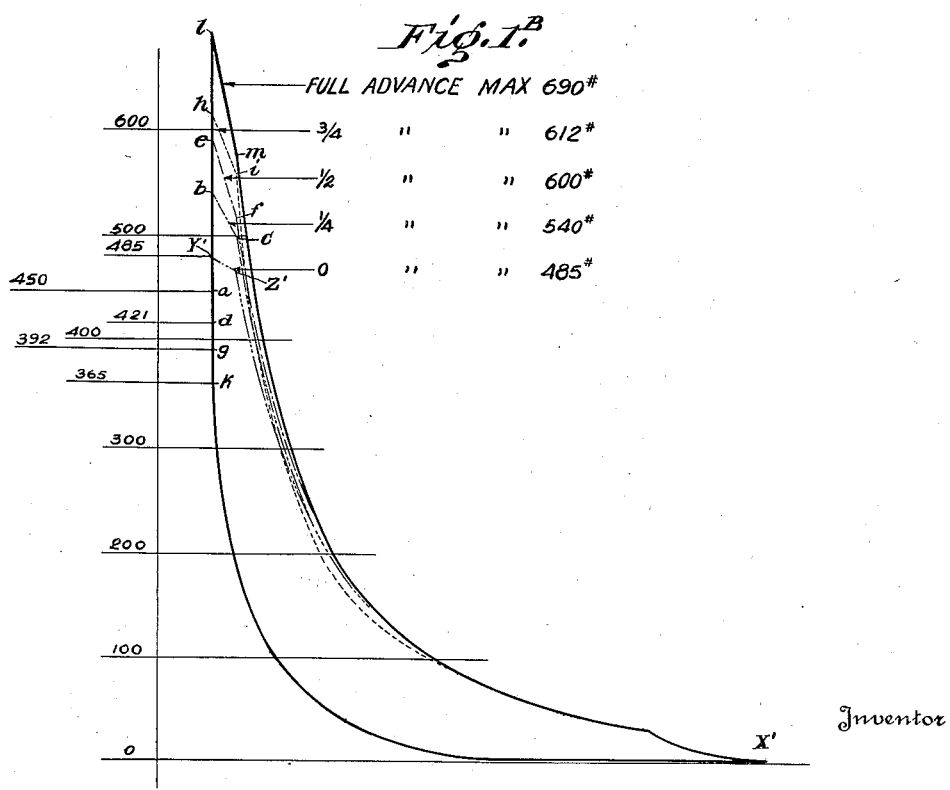
Inventor
André C Attendu
By Fetherstonhaugh & Co
Attorney

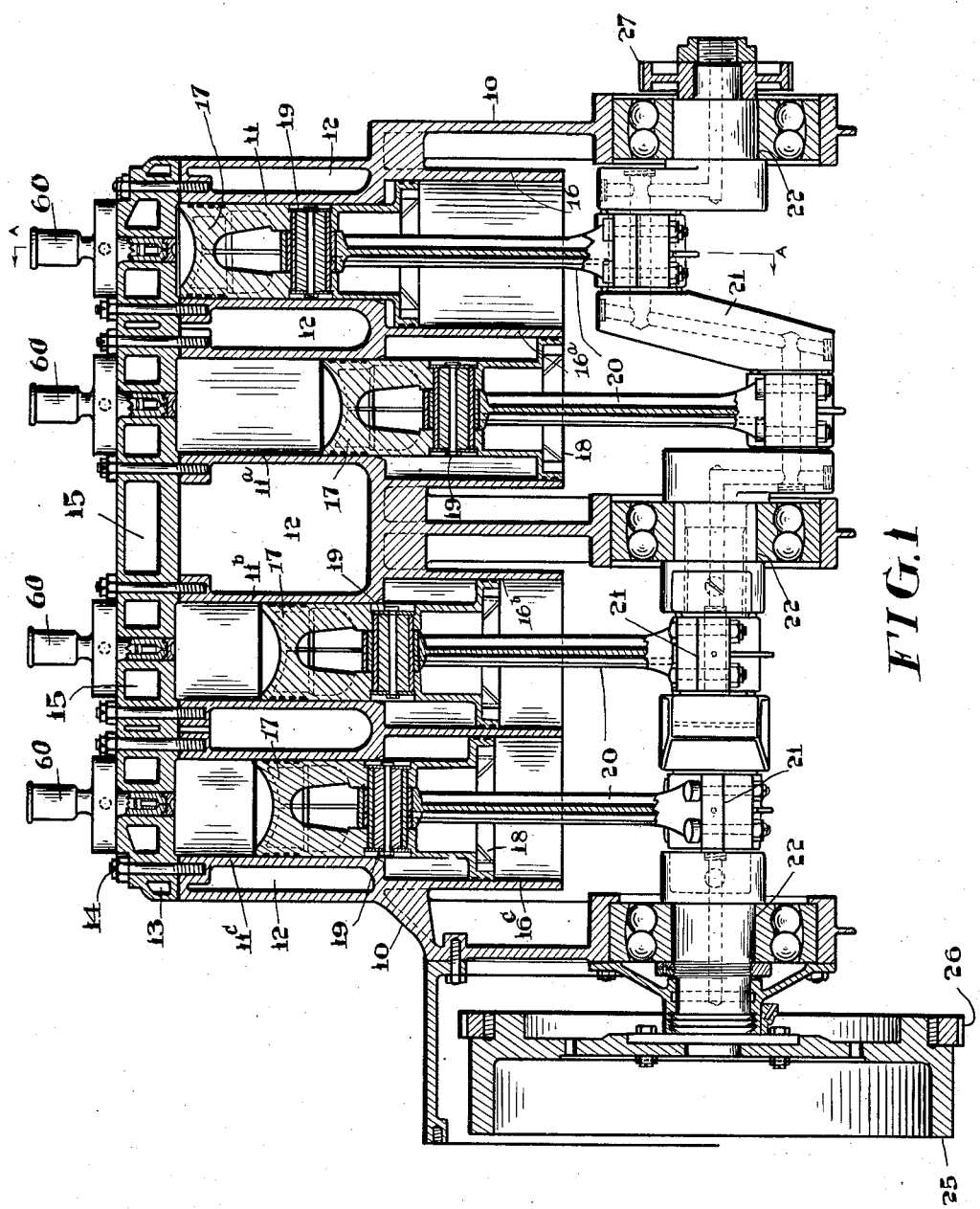

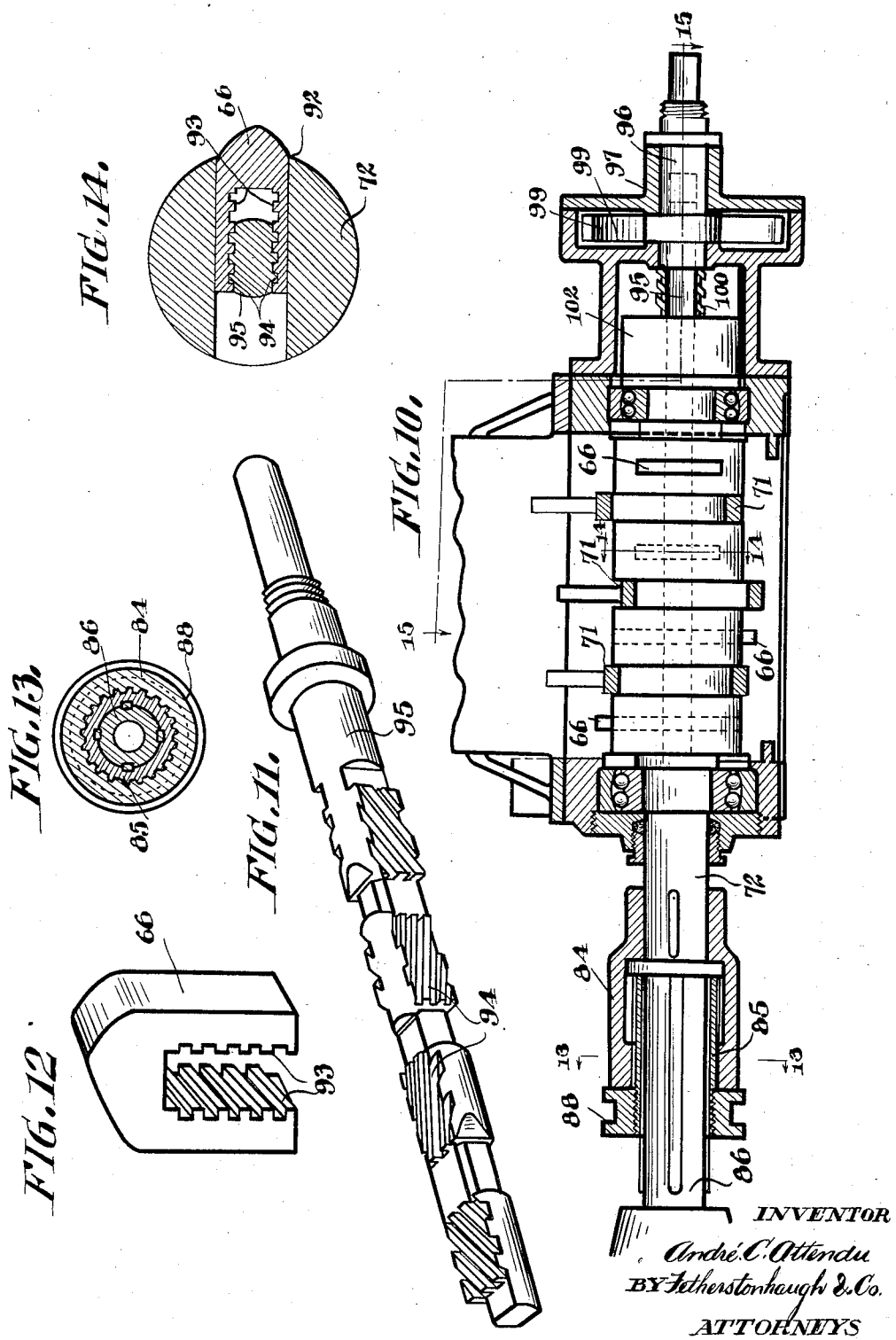

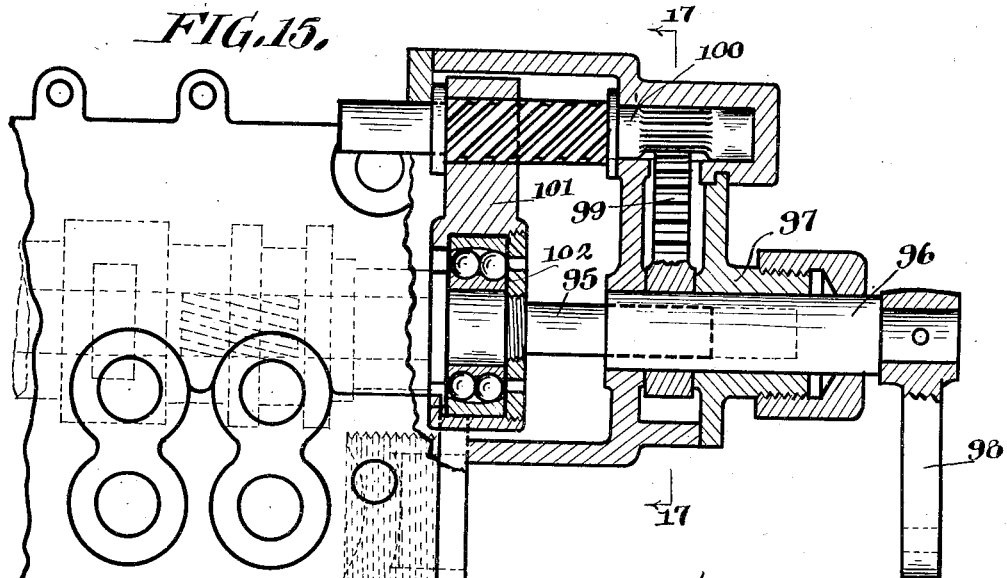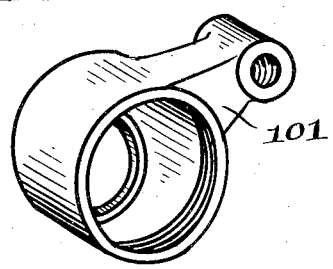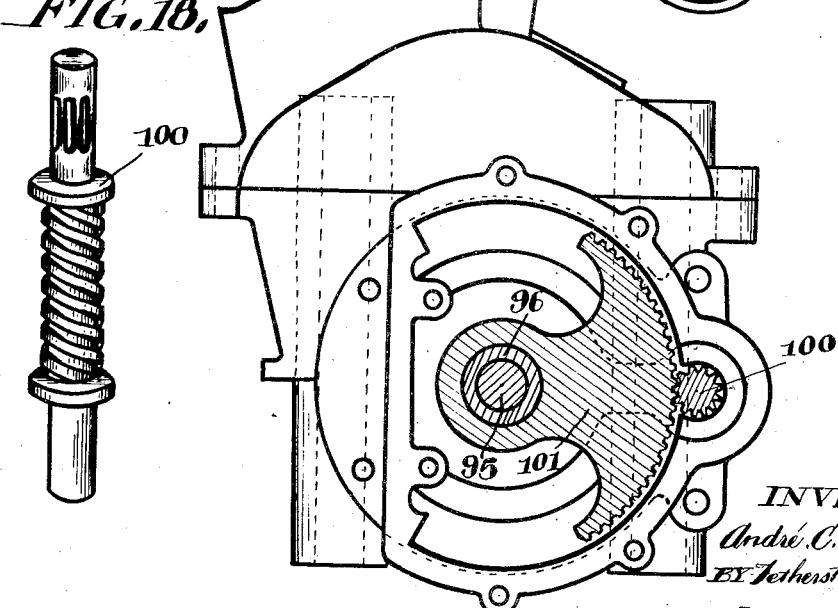

Patented Sept. 24, 1929

1,729,201

UNITED STATES PATENT OFFICE

ANDRÉ C. ATTENDU, OF MONTREAL, QUEBEC, CANADA

INTERNAL-COMBUSTION ENGINE

Application filed October 27, 1923. Serial No. 671,181.

This invention relates to a new and improved method of operating internal combustion engines involving a new series of operations in engines burning a heavy fuel oil.

The objects of the invention are to provide (a) an engine capable of operating at constant torque under variable speeds (b) an engine capable of operating at widely varying speeds under constant load or under variable loads at constant speed (c) an engine capable of igniting its fuel when injected at any point within predetermined minimum and maximum compression pressures irrespective of engine speed (d) an engine capable of operating at variable ultimate combustion pressures obtained as a result of timing the injection of fuel between minimum and maximum limits.

Other objects will appear from a further detailed description of the operation hereinafter described.

Briefly stated, the operating cycle of my invention depends upon the following factors.

First: Compression of air to produce in each cycle ignition pressures and temperatures which remain constant at predetermined points of fuel injection.

Second: Adjustment of a precompression volume of air approximately at atmospheric pressure to effect upon compression a constant pressure at predetermined points of fuel injection irrespective of engine speed.

Third: Variation in time and duration of the fuel injection period within predetermined limits of ignition temperature.

Fourth: Variation of ultimate combustion pressures dependent upon timing of fuel injection.

In the drawings:

Figure 1ª is a diagram of the well-known Diesel cycle.

Fig. 1ᵇ is a reproduction of an indicator card diagram taken from my engine.

Figure 1 is a central longitudinal section through the engine.

Figure 10 is a view partly in vertical section and partly in elevation of the lower portion of the pump mechanism.

Figure 11 is a perspective view of an operating rod for adjusting the cam lifts.

Figure 12 is a perspective view of one of the cam lifts.

Figure 13 is a sectional view taken on the line 13—13 of Fig. 10.

Figure 14 is a sectional view taken on the line 14—14 of Fig. 10.

Figure 15 is a plan view of the pump mechanism partly broken at one end to show one of the control mechanisms.

Figure 16 is a perspective view of details.

Figure 17 is a sectional view along the line 17—17 of Fig. 15.

Figure 18, is a perspective view of a detail.

Figure 2:
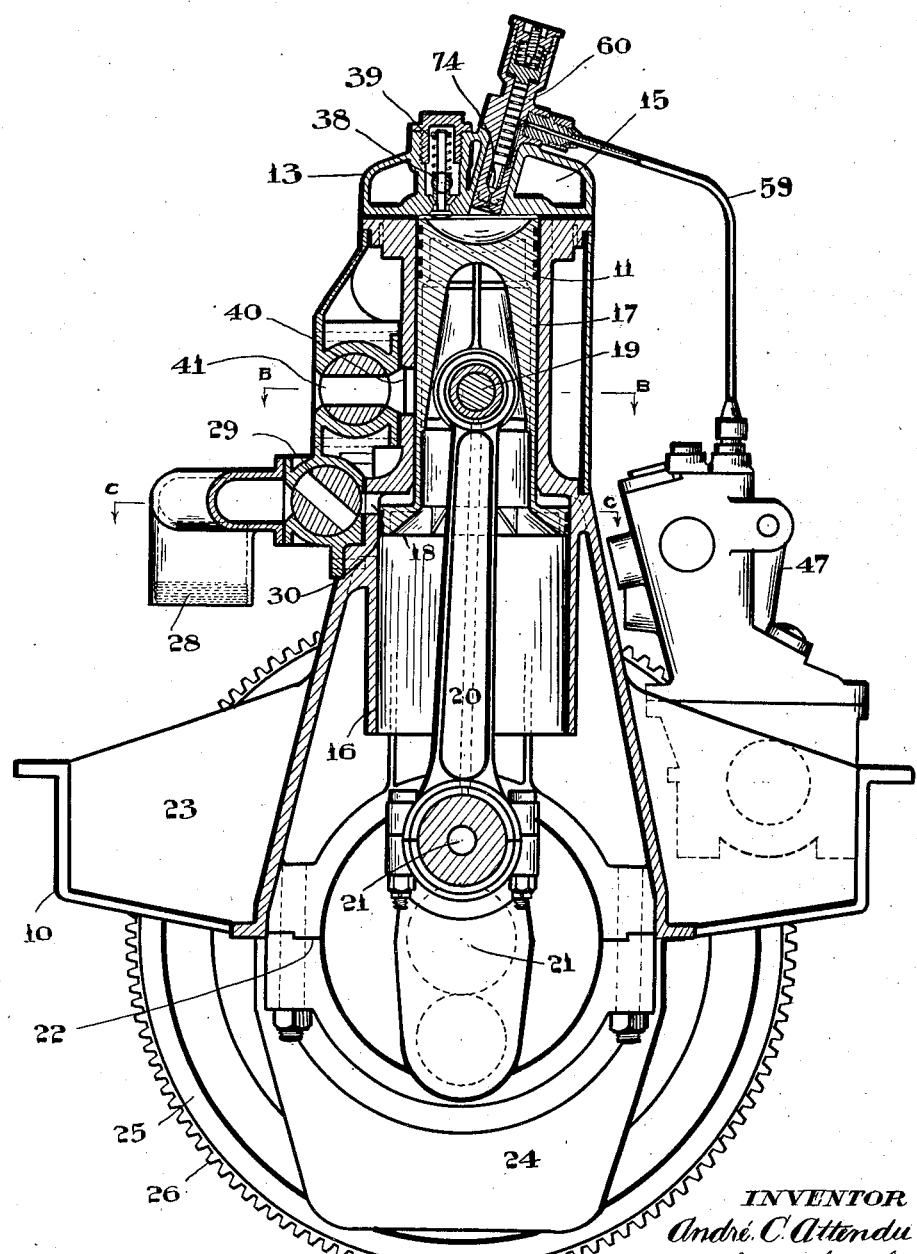
Figure 2 is a cross section on the line A—A of Figure 1.

*Analytical comparison with Diesel cycle of operation*

The cycle of operations which may be best compared to the cycle according to my invention is illustrated by the well-known Diesel cycle as represented by Figure 1ª.

In this cycle the steps involved are as follows:

(a) Increase of pressure and temperature up to ignition temperature by adiabatic compression of air.

(b) Injection of fuel at the maximum ignition temperature.

(c) Gradual combustion of the fuel at constant pressure during the period of injection.

(d) Expansion and exhaust of the gases.

In Figure 1ª the compression stroke is represented by the compression curve X—Y, the period of injection and combustion by the line Y—Z the combustion pressure being approximately constant.

The curve Z—X represents the expansion period and exhaust. It is to be noted that the fuel is injected at the fixed point Y, this point being at, or near, the top of the compression stroke when the ignition pressure and temperature are constant. The characteristic feature of this cycle is a substantially constant combustion pressure.

The characteristic features of the cycle of my invention as illustrated in Figure 1ᵇ are as follows:

(a) Adiabatic compression to variable points in the compression stroke sufficient to create an ignition pressure.

(b) Injection of the fuel commencing at desired intervals (within predetermined limits) between maximum advance and the top of the compression stroke.

(c) Combustion of the fuel during the period of injection resulting in an ultimate pressure which is controlled by the time of injection and which is the sum of the compression pressure for the full length of the stroke plus the combustion pressure due to the burning of the fuel while the compression cycle is still in progress.

(d) Expansion and exhaust.

It is to be noted that the effect of combustion against compression is to produce a distinctive maximum ultimate pressure in the cylinder variable for each different timing of injection and its accompanying adjustment of the quantity of air compressed in the cylinder thus producing a constant torque irrespective of engine speeds. By varying the quantity of fuel injected a constant speed under different load conditions may be obtained.

Referring now to Figure 1ᵇ which is a reproduction of an indicator card diagram taken from my invention and assuming that injection of fuel occurs at the top of compression stroke the compression curve will be represented by X'—Y'. The period of combustion will then be represented by the lines Y'—Z' and expansion and exhaust will be represented by curve Z'—X'. In this case the cycle would be similar to that of Diesel. In practice, however, fuel is injected prior to the top of the compression stroke and the limits within which injection of fuel may begin are determined by the minimum pressure at which ignition of the fuel may occur and the maximum compression pressure at the completion of the compression stroke. Thus, on the card shown the maximum compression pressure is 485 pounds while the minimum pressure permissible for fuel injection and combustion is 365 pounds and this variation is represented by approximately 40° of crank angle with respect to top dead center.

When fuel injection occurs at one quarter advance or about 9° the compression has reached 450 pounds. At this point fuel is injected and the resultant curve is represented by the lines a—b—c the ultimate pressure represented at b being 540 pounds made up as a result of the maximum compression pressure plus the pressure resulting from the combustion of the injected fuel. Similarly when fuel is injected at one-half advance or about 18° the compression pressure has reached 421 pounds. Consequently the resulting curve is represented by the lines d—e—f, the ultimate maximum pressure at e being 600 pounds. With fuel injected at three-quarter advance or approximately 27° the compression pressure is 392 pounds and the resulting curve is represented by the lines g—h—i, the maximum ultimate pressure at h being 612 pounds. With fuel injected at approximately maximum advance or 37° the compression pressure is 365 pounds the resultant curve being represented by the lines k—l—m, and the maximum ultimate pressure at l being 690 pounds.

The results shown on this diagram were obtained at constant load and the minimum limit of ignition pressure was determined for fuel testing 24° Baumé.

This diagram shows a cycle of operations in which variable ultimate pressures are obtained by varying the timing of the injection of fuel and this is an important factor in producing an engine capable of operating at constant torque irrespective of engine speeds or at constant speed irrespective of load.

Referring to the drawings by numerals of reference:

*Engine block and piston construction*

I provide an engine block 10 in which the power cylinders 11, 11ª, 11ᵇ, and 11ᶜ, herein shown as four in number, are formed and surrounded by the usual water jacket 12. The cylinder head may be removable, as herein shown, and secured to the block by the screw bolts 14. The head may likewise be provided with water spaces or chambers 15 through which the water of the cooling system may circulate and maintain the parts at an even and proper temperature. For each power cylinder I provide a pumping cylinder which, as herein shown, is formed integral with the block and positioned below and in axial alinement with a power cylinder, this arrangement tending to simplicity of structure and not being essential to the proper operation of the engine. The pumping cylinders are designated 16, 16ª, 16ᵇ and 16ᶜ.

In each power cylinder I provide a piston 17 of the usual trunk form, which is elongated and has its lower end 18 of enlarged diameter to form a piston for the pumping cylinder, thus making the one piston serve for both cylinders. The piston is connected through the usual wrist pin 19 to a connecting rod 20, the lower end of which rod is connected in the usual manner with the crank shaft 21, journaled in bearings 22, preferably formed integral with the block. The block may be formed with a skirt 23 which forms a crank case the bottom of which is closed by the usual oil pan 24. The rear protruding end of the crank shaft has a flywheel 25 secured thereto on the periphery of which gear teeth 26 may be provided for engagement with a usual form of starter, while on the front end of the shaft is secured a pinion 27 through which parts of the engine mechanism are actuated, as will be hereinafter described.

*Air compressors and transfer valves*

Figure 4:
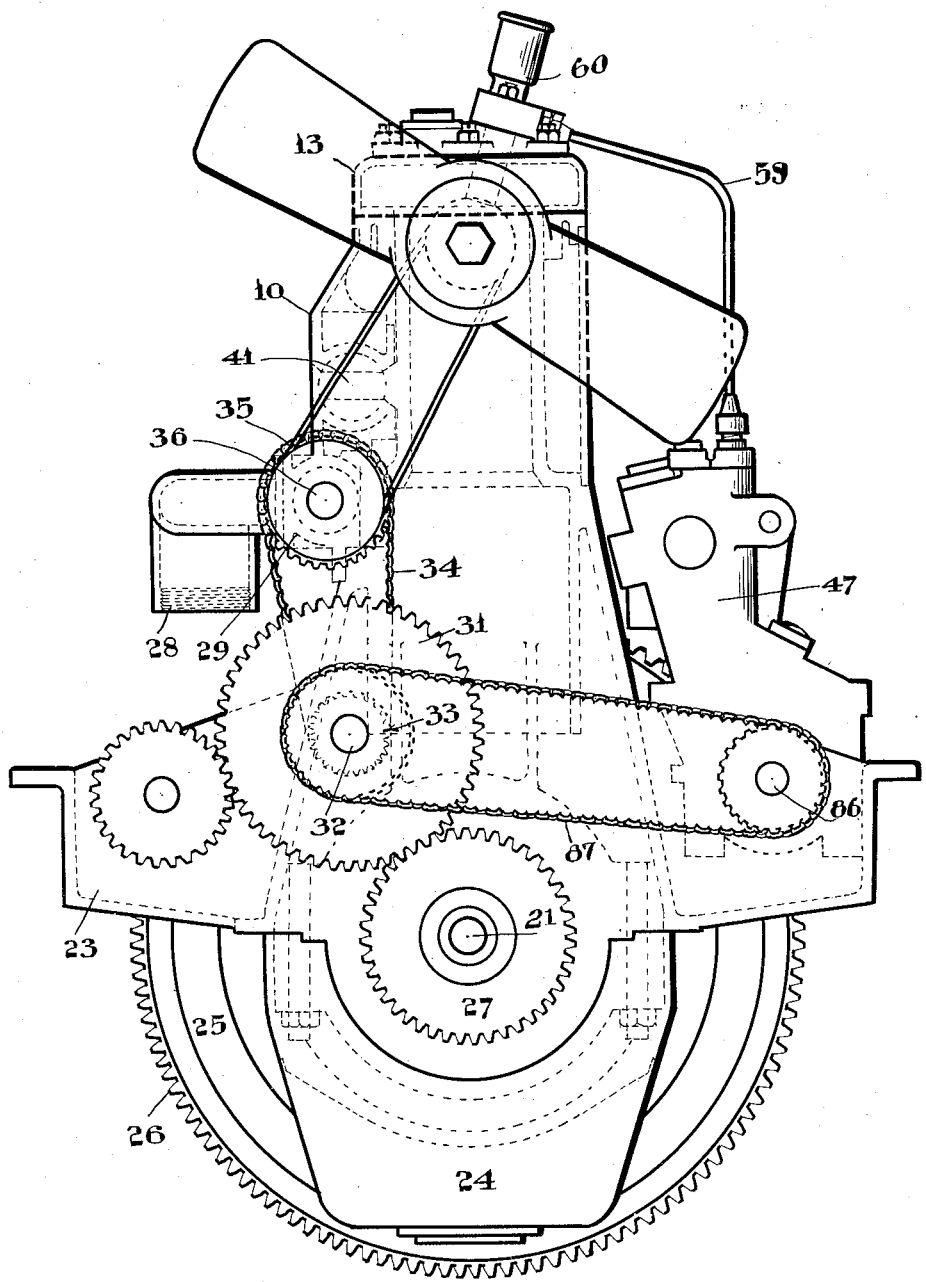
Figure 4 is a front end elevation.
Figure 5:
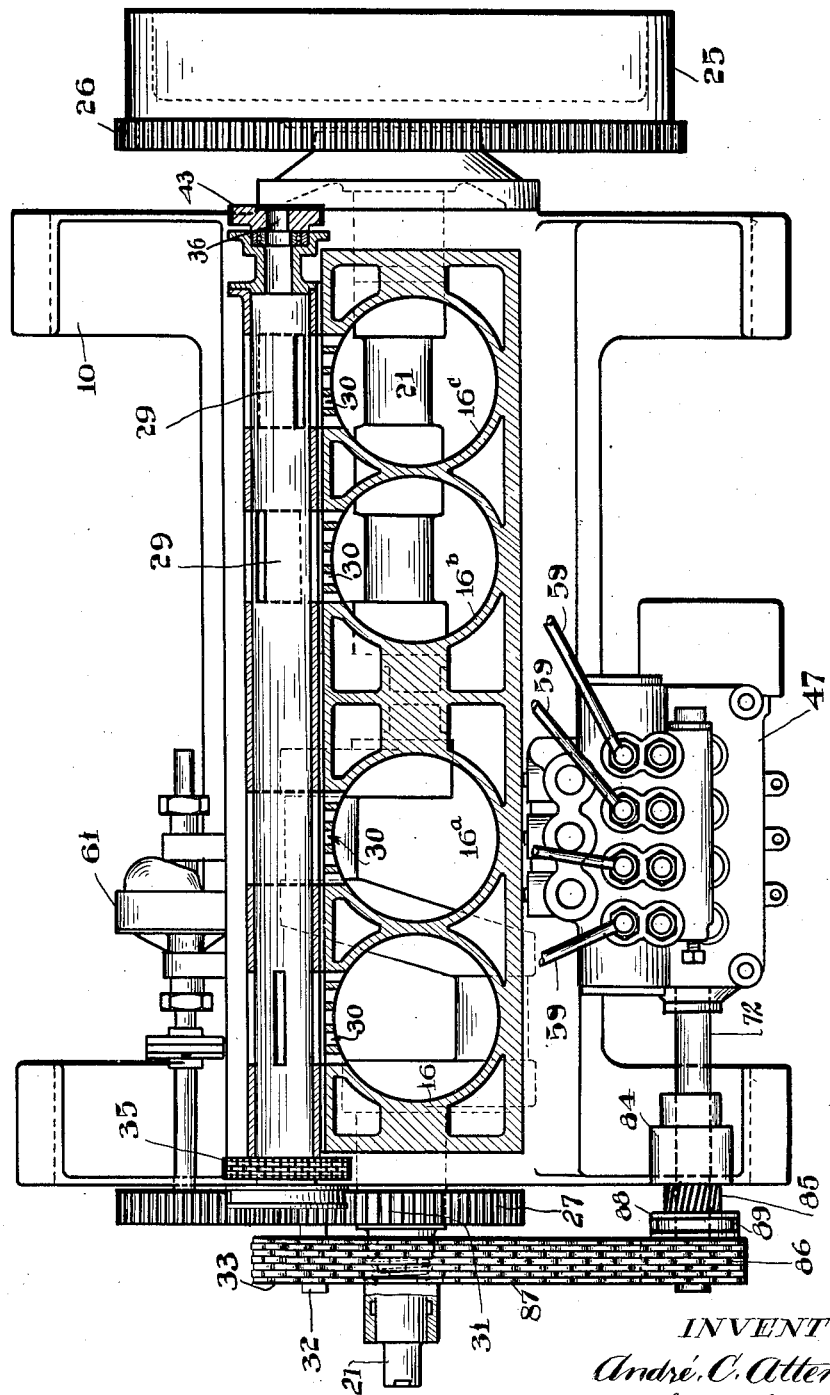
Figure 5 is a horizontal section taken on the line B—B of Figure 2.
Figure 6:
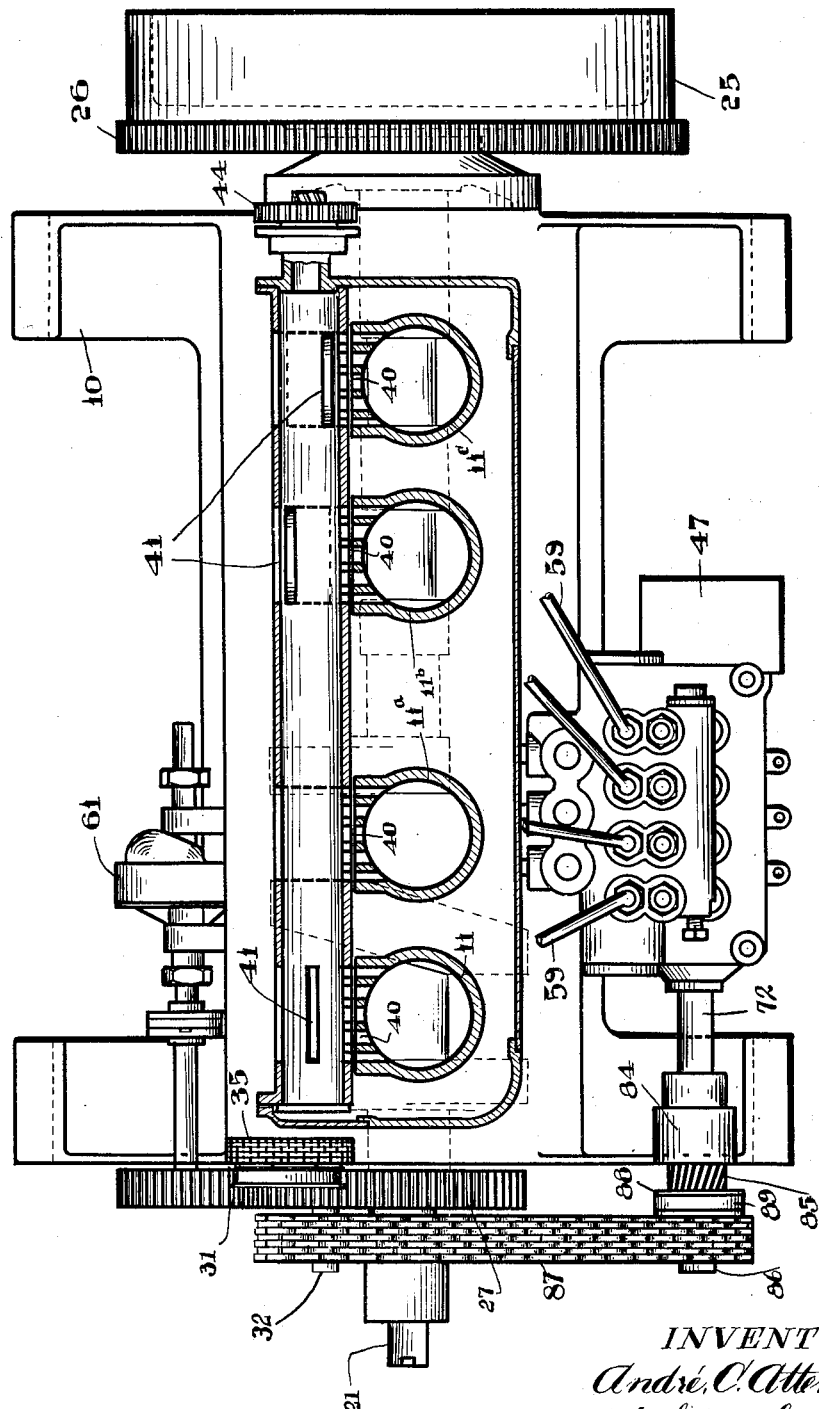
Figure 6 is a similar section taken on the line C—C of Figure 2.
Figure 7:
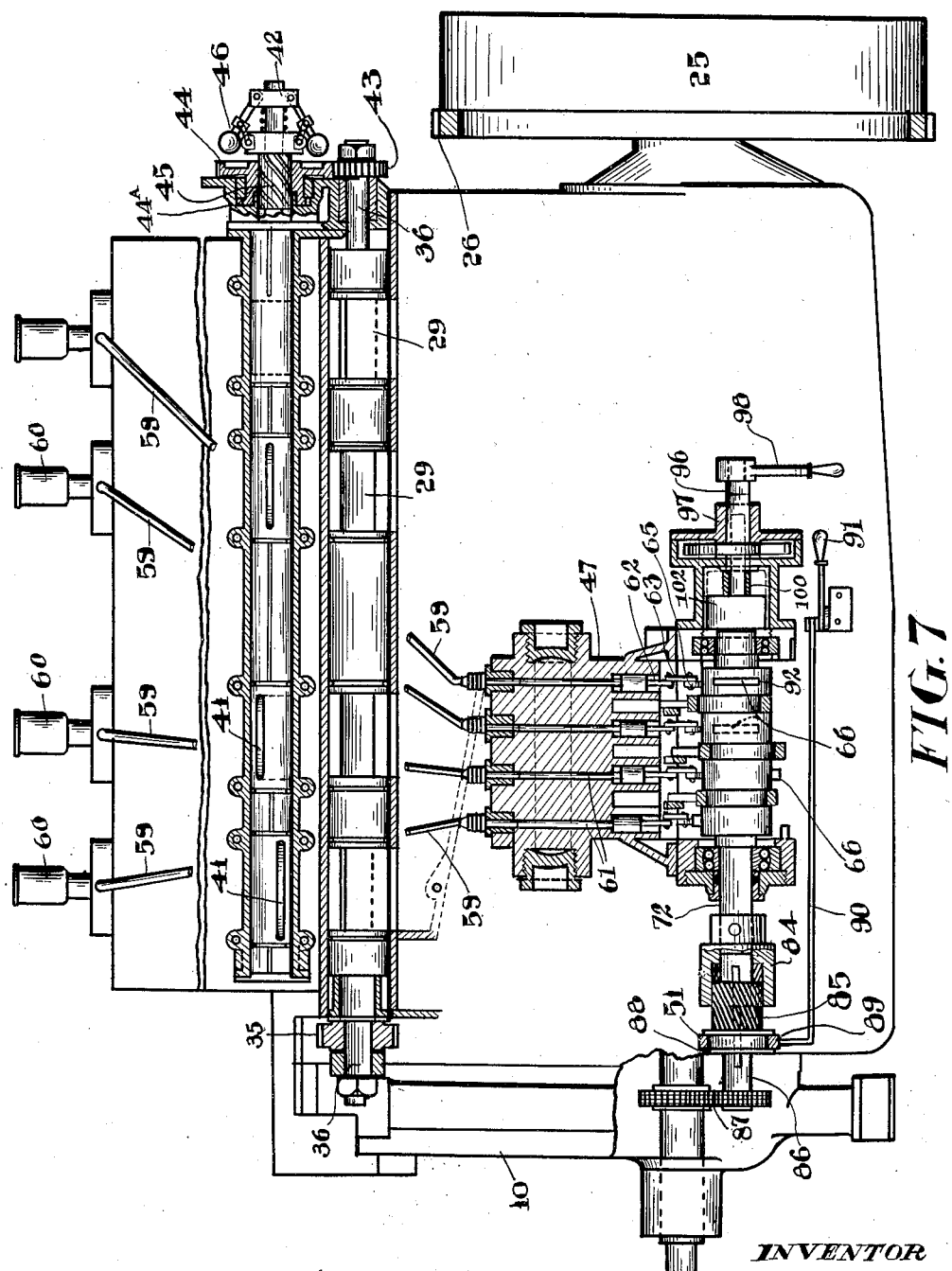
Figure 7 is a side elevation, partly in section showing the valves, pump and governor.
Figure 8:
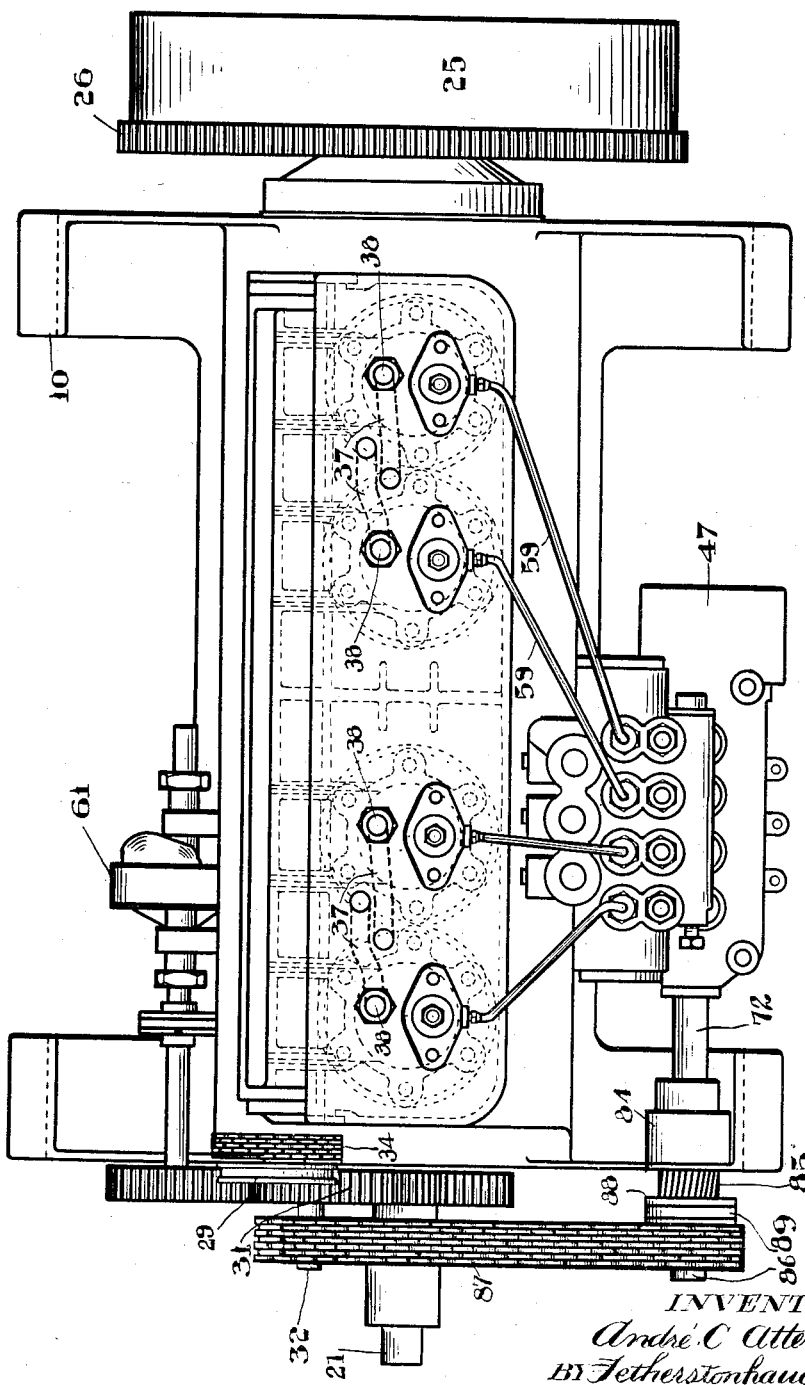
Figure 8 is a plan view.

It is essential to the proper operation of an engine of the present type that air be supplied to the power cylinders and that such air be under sufficient initial pressure for scavenging purposes; for which reason, as will appear most clearly in Figure 1, the swept volume of the pumping cylinders is greater than the volume of the power cylinders. Air is supplied from the pumping cylinders to the power cylinders, preferably in the following order: power cylinder 11 receives air from pumping cylinder 16$^a$, and power cylinder 11$^a$ receives its air from pumping cylinder 16 while power cylinder 11$^b$ receives air from pumping cylinder 16$^c$, and power cylinder 11$^c$ receives air from pumping cylinder 16$^b$. The air is supplied in the following manner: on the downward or power stroke of a piston air is drawn into the pumping cylinder through an air manifold 28, valve 29, herein shown as a rotary valve, and port 30. These parts are shown most clearly in Figures 2 and 4. When the pumping piston has reached the lowermost point of its stroke, the valve 29 is closing, being actuated through pinion 27 which meshes with an idler pinion 31, rotatable on a stub shaft 32, which shaft is secured to and projects forwardly of the engine and on which is fixed a sprocket wheel 33 connected through a sprocket chain 34 with a sprocket wheel 35 rigid on the front end of the valve stem 36. The valve 29, being closed, the up stroke of the piston will compress the air in the pumping cylinder above the advancing piston and in the pipe 37 (see Figure 8) until the pressure of the air upon the air inlet valve 38 (Figure 2) is sufficient to overcome the force tending to hold the valve upon its seat, which force results from the pressure of the gases in the power cylinder upon the valve and the tension of the valve seating spring 39, when the valve will unseat allowing the air to rush into the power cylinder, driving the gases of combustion ahead of it through the exhaust port 40, which has been uncovered by the piston of that power cylinder on its downward stroke, and exhaust valve 41 to the atmosphere.

*Mechanism for controlling exhaust and maintaining constant compression pressures and temperatures irrespective of engine speed*

Figure 3:
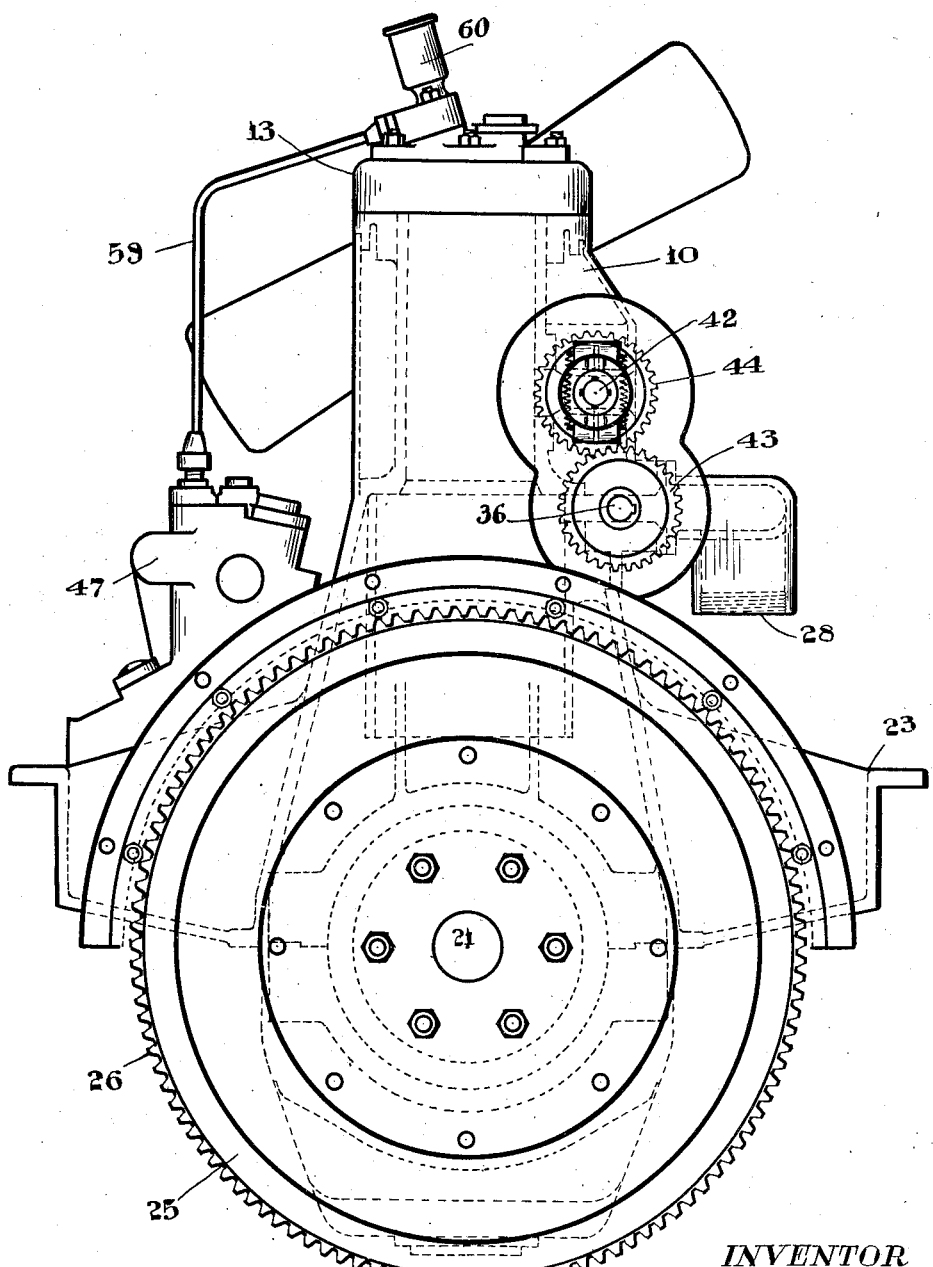
Figure 3 is a rear end elevation.

The exhaust valve 41 is made use of not only to exhaust the gases from the power cylinder but also to control the volume of the air in the power cylinder at the beginning of the compression stroke. For this purpose the valve is driven through a pinion 43 connected to the rear end of the intake valve stem 36 and meshing with a pinion 44 and connected to the rear end of the stem 42 of the exhaust valve (Figure 3), the connection of the pinion 44 with the valve stem being effected in such a way that the angular position of the valve with respect to the pinion may be changed, thus changing the time of opening and closing of the exhaust valve and so controlling the volume of air which will be compressed in the power cylinder by allowing more or less of such air to escape through the exhaust port before the same closes.

While any suitable mechanism may be used for accomplishing this adjustment of the valve I prefer to make use of that herein shown wherein I provide a housing 44$^a$ carrying the pinion 44 which is provided with a central aperture in the walls of which are cut splines to engage the curved splines formed exteriorly of a sleeve 45 which sleeve is feathered on the valve stem 42 to slide longitudinally thereof, being moved to desired position by means of the centrifugal governor 46. While I have shown a governor for automatically moving the sleeve in accordance with engine speed, it is to be understood that any of the well-known manually operated means for effecting such an adjustment may be resorted to.

The effect of controlling the exhaust valve as heretofore described is to give an established range of ignition pressures for each compression stroke which range remains constant in succeeding cycles of operation irrespective of engine speed. Ordinarily, when an engine of the high compression or solid fuel burning type is running at high speed the cylinder walls are much warmer owing to the more frequent compressions and explosions, and there is much less time during each compressing operation for loss of heat, so that, starting with air charges equal as to volume and pressure, the resultant pressure when operating at high speed is much greater than the resultant pressure when operating at low speed. This difference is compensated for in the present invention by timing the closing movement of valve 41 to regulate the volume and pressure of air at the commencement of compression in inverse ratio to engine speed.

Fuel pump

To effect injection of fuel into the working cylinders under the requisite working pressure there is provided a two-stage pumping mechanism 47 embodying a fuel intake chamber 48 which communicates with a suitable fuel supply, not shown. Chamber 48 also communicates via passages 49 with pump bores 50 in each of which is reciprocally positioned a piston 51 of the plunger type. The pump bores 50 communicate via check valve 52 and passages 53 with fuel reservoir 54. Fuel reservoir 54 communicates with the pump bores 55 via valves 56 and passages 57. Passages 58 establish communication between pump bores 55 and injector lines 59 leading to injector 60 hereinafter referred to.

A reciprocating piston 61 of the plunger type is positioned in each bore 55. The lower end of this piston is linked as at 62 to the free extremity of a rocker arm 63 the other extremity of which is mounted on a shaft 64. At an intermediate point rocker arm 63 is provided with a roller 65 positioned to be engaged by a cam lift 66. The roller 65 is maintained in yieldable contact with the cam 66 by a spring pressed plunger 67.

The lower end of each plunger 51 is linked as at 68, to one extremity of rocker arm 69, the other extremity of which is mounted on shaft 64. Rocker arm 69 at a point intermediate its extremities is pivotally connected by a pin 70 to the eccentric strap 71 encircling a suitable eccentric form on the hollow shaft 72.

Injector valve construction

The injectors 60 each embody a suitable housing in which is positioned a reciprocatory plunger 73 reduced at its lower end to form a needle valve 74 for cooperation with a seat 75. A passageway 76, formed in the housing communicates at one end with injector line 59 and at its opposite end with annular space 77 located between a shoulder 78 and an atomizer 79. A balancing spring 80 confined between the upper end of plunger 73 and cap member 81 serves to normally maintain the valve in seated position. The upward throw or lift of plunger 73 may be regulated by a stop 82 adjustable in the aforementioned cap member 81.

Operation of fuel pump and injector valve

In the operation of the pumping mechanism, previously outlined, fuel is drawn from intake 48 into pump bore 50 on the down stroke of plunger 51 and, on the up stroke of said plunger the fuel, unseating valve 52, is forced through passage 53 into oil reservoir 54 wherein it is confined under a predetermined pressure, maintained approximately constant by a relief valve (not shown) which is suitably positioned in a by-pass 83 between the reservoir and the fuel supply. From reservoir 54 the fuel passes through valve 56, passages 57 and 58, injector line 59 and passage 76 of the injector housing to annular space 77. The pressure of the oil in the fuel reservoir and consequently in the circuit just established is approximately 1500 lbs. per square inch, which is maintained approximately constant by the relief by-pass hereinbefore mentioned.

The oil, when under normal pressure of 1500 lbs. per square inch is prevented from entering the cylinder through the injector by means of balancing spring 80 retaining the valve in a seated position.

At the time of fuel injection, however, the fuel pressure is increased by the upward movement of pump plunger 61. This increase in pressure closes valve 56, disrupting communication between the reservoir and that part of the circuit comprising pump bore 55, injector line 59 and injector 60 so that the excess pressure developed acting upon shoulder 78 will unseat the needle valve 74 against the tension of balancing spring 80. As the pump plunger 61 moves downwardly on the return stroke the resultant drop in pressure permits the spring 80 to return the needle to its seat and thus terminate injection. Concomitant with this action, valve 56 is re-opened and the normal pressure of the circuit re-established.

Mechanism for varying time of fuel injection

To vary the time of fuel injection the cam lifts 66 hereinbefore mentioned, are shifted so that their action may be advanced or retarded dependent upon the particular timing required and this result is accomplished through the following arrangement. Shaft 72, in which the lifts 66 are mounted, is equipped at one end with a fixed collar 84 provided with internal curved splines for cooperation with complemental splines formed on the exterior surface of a sleeve 85, feathered to slide longitudinally on a shaft 86 axially aligned with the shaft 72 and driven through a chain and sprocket mechanism 87. At one end sleeve 85 is equipped with a channeled collar 88 engaged by a yoke 89 formed on one end of an actuating rod 90, the opposite end of which rod is connected to a control lever 91. Manifestly, when the sleeve 85 is shifted longitudinally on the shaft 86 the curved splines of said sleeve, cooperating with the complemental splines of sleeve 84, will rotate the shaft 72 to effect the desired displacement of lifts 66 with respect to rollers 65 and consequently change the time of actuating pump plunger 61 dependent upon whether the lifts are shifted in a direction to advance or retard their contact with said rollers.

Mechanism for varying quantity of fuel injected

In order to regulate the quantity of fuel injected, cam lifts 66 are radially adjustable in slots 92 formed in the shaft 72 and arranged as shown. These lifts are each formed with opposing sets of splines 93 engaging complemental splines 94 on a rod 95 mounted to slide longitudinally in the hollow shaft 72.

As shown in Fig. 10, the outer end of rod 95 is slidably supported in a hollow shaft 96 mounted in a bearing 97 and equipped at its outer end with a crank handle 98. Adjacent its inner end shaft 96 carries a gear segment 99 meshing with suitable teeth formed on a rotatably mounted worm 100. The worm 100 is threaded through a follower 101, equipped at its lower end with a suitable bearing 102 whereby a revoluble non-sliding connection is obtained between the follower and the said shaft 95. Manifestly, movement of the crank 98 in the proper direction will effect through gear segment 99, worm 100 and follower 101 the requisite longitudinal movement of rod 95. This movement of rod 95 causes the splines 94 to cooperate with splines 93 on the lifts 66 whereby the latter are adjusted radially to vary the length of the stroke imparted to the pump pistons 61.

Effect of varying fuel injection

If, in the operation of the engine, it is desired to obtain merely an increase in speed, it is simply necessary to advance the time of fuel injection and this may be accomplished by manipulating the control lever 91 to advance the time of contact between the cam lift 66 and the rollers 65. On the other hand, if the engine is operating at a certain speed and there is an increase in load, this may be compensated for, without altering the time of injection, by manipulating the crank 98 to effect, through the instrumentalities mentioned, (in connection therewith) the radial adjustment of cam lifts 66 necessary to increase the stroke of the plunger 61 and consequently the quantity of fuel supplied thereby. If it is desired to increase the speed of the engine and at the same time vary the load capacity then both control levers 91 and 98 should be manipulated simultaneously to vary both the time and quantity of fuel injection.

Summary

Figure 9:
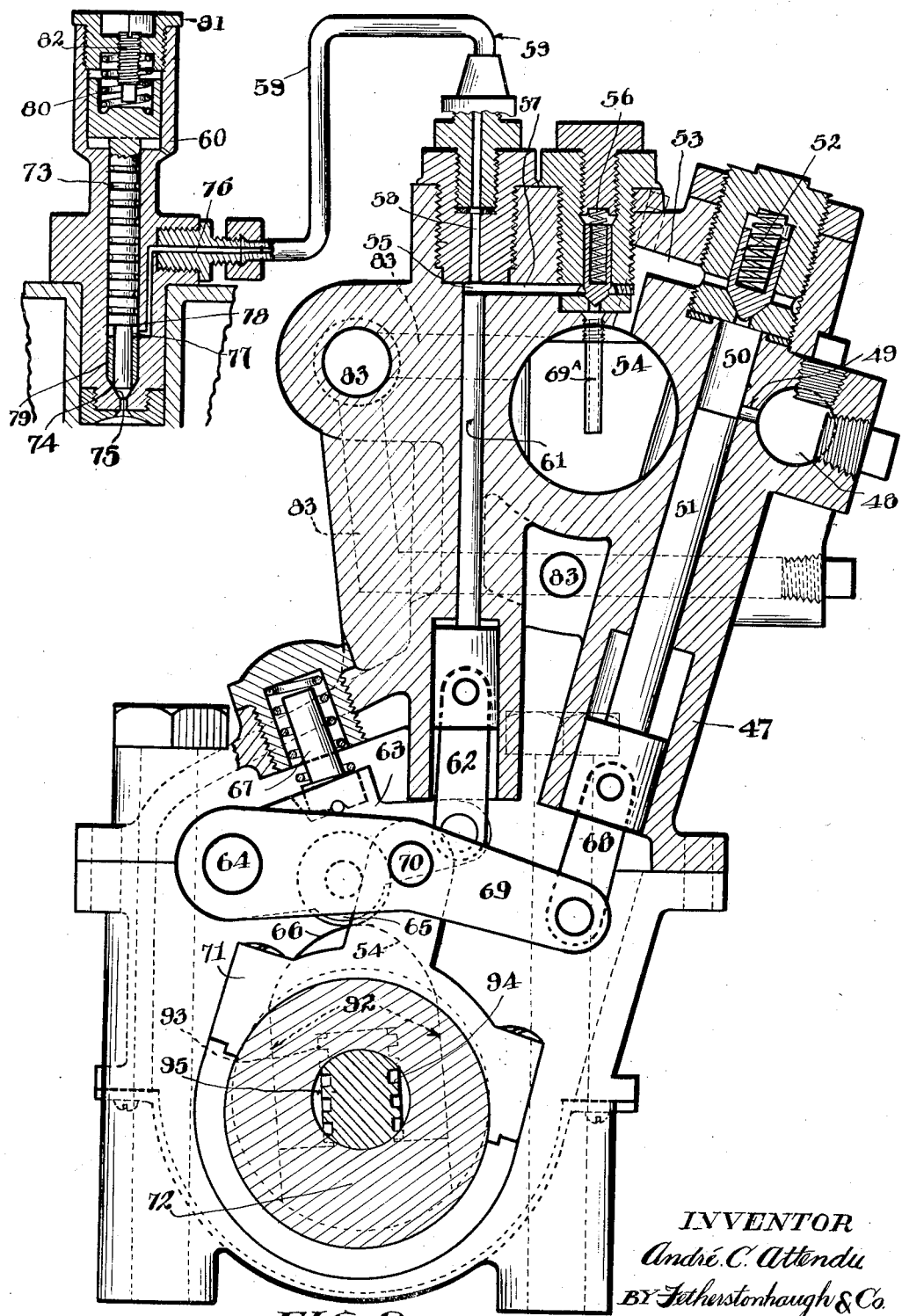
Figure 9 is a sectional elevation of one form of fuel pump and injector.

In reviewing the complete operation of the several mechanisms, previously described, the essential steps may be summarized as follows:

A charge of fresh air is transferred from the pumping cylinder into the working cylinder where it is compressed, to a predetermined maximum pressure at the top of the stroke. This maximum compression pressure remains constant under all speeds by reason of the fact that the volume of air compressed is automatically regulated in inverse ratio to the speed of the engine. It may be stated here that the maximum compression pressure may be determined by the character of the fuel employed. The volume of air compressed is varied through the mechanism of the exhaust valve 41 the operation of which has been fully described. Having established the maximum compression pressure required it next becomes necessary to determine the limits within which fuel may be injected and immediately ignite it prior to the top of the compression stroke. Obviously, these limits are fixed by the minimum ignition pressure and temperature of the fuel employed and the earliest point of injection is thus established. As ignition occurs at any points within these limits injection of fuel may be timed accordingly. The mechanism for varying the time of injection is fully described with reference to the pump and pump actuating mechanism shown in Figure 9. The diagram shown in Figure 1$^b$ illustrates fully the effect of variation of the time of injection of fuel. Here it will be seen that in order to raise the mean effective pressure in the working cylinder injection of fuel should be advanced. By advancing the time of fuel injection with accompanying adjustment of the quantity of air compressed to effect fuel ignition increase in speeds may be obtained and also a constant torque may be obtained throughout a very wide range of engine speed.

What I claim as my invention is:

1. A method of operating a high compression engine consisting in varying speed by changing the time of fuel injection and varying the quantity of air compressed in the working cylinder concurrently with and in such inverse ratio to speed variation as to maintain thermal conditions, characteristic of any given stage of compression, approximately constant for all cycles of operation.

2. A method of operating a high compression engine consisting in varying the quantity of fuel injected into the working cylinder, varying the time of injection for any given quantity of fuel injected and varying the quantity of air compressed in the cylinder concurrently with and in such predetermined inverse ratio to speed variations as to maintain the thermal conditions, characteristic of any given stage of compression, approximately constant for all cycles of operation.

3. A method of operating a high compression engine consisting in simultaneously varying both the quantity of fuel injected into the working cylinder and the time of fuel injection and varying the quantity of air compressed in the working cylinder concurrently with and in such predetermined inverse ratio to speed variations as to maintain the thermal conditions, characteristic of any given stage of compression, approximately constant for all cycles of operation.

4. A method of operating a high compression engine consisting in varying speed by changing the time of fuel injection varying the quantity of fuel injected simultaneously with or independently of varying the time of fuel injection and varying the quantity of air compressed in the working cylinder concurrently with and in such inverse ratio to speed variations as to maintain the thermal conditions, characteristic of any given stage of compression, approximately constant for all cycles of operation.

5. A method of operating a high compression engine consisting in maintaining a definite preliminary fuel pressure throughout the injector line, effecting injection of fuel by periodically increasing the pressure in said injector line, varying the speed of the engine by timing commencement of the pressure increase, and varying the quantity of air compressed in the cylinder concurrently with and in such inverse ratio to speed variations as to maintain the thermal conditions, characteristic of any given stage of compression, approximately constant for all cycles of operation.

6. A method of operating a high compression engine consisting in maintaining a definite preliminary fuel pressure throughout the injector line, normally obstructing the delivery end of the injector line to disrupt communication therebetween and the engine cylinder, periodically increasing the fuel pressure in the injector line to displace said obstruction and effect injection of the fuel, regulating the speed of the engine by timing commencement of the fuel pressure increase, regulating the load capacity of the engine by controlling said increase of fuel pressure in such manner as to effect injection of different quantities of fuel and varying the quantity of air compressed in the cylinder concurrently with and in such inverse ratio to speed variations as to maintain the thermal conditions, characteristic of any given stage of compression, approximately constant for all cycles of operation.

7. A method of operating a high compression engine consisting in maintaining a definite preliminary fuel pressure throughout the injector line leading to the engine cylinder, normally obstructing the delivery end of the injector line to disrupt communication therebetween and the engine cylinder, periodically increasing the fuel pressure in the injector line to displace said obstruction and effect injection of the fuel, varying the time of commencing such increase of fuel pressure to thereby vary the operating speed of the engine, varying the duration of the aforesaid fuel pressure increase to thereby vary the quantity of fuel injected for any given time of injection and causing the quantity of air compressed in the cylinder to be increased as the time of injection is advanced and decreased as the time of injection is retarded and in such inverse ratio to speed variations as to maintain the thermal conditions, characteristic of any given stage of compression, approximately constant for all cycles of operation.

In testimony whereof I hereunto affix my signature.

ANDRÉ C. ATTENDU.